June 9, 1936. H. M. COUNCIL 2,043,404
INSECT REPELLER
Filed Dec. 6, 1934 2 Sheets-Sheet 1

Inventor
H. M. Council

By Clarence A. O'Brien
Attorney

June 9, 1936. H. M. COUNCIL 2,043,404
INSECT REPELLER
Filed Dec. 6, 1934 2 Sheets-Sheet 2

Inventor
*H. M. Council*

By *Clarence A. O'Brien*
Attorney

Patented June 9, 1936

2,043,404

UNITED STATES PATENT OFFICE 2,043,404

INSECT REPELLER

Henry Marvin Council, Atlanta, Ga.

Application December 6, 1934, Serial No. 756,323

2 Claims. (Cl. 230—242)

The present invention relates to new and useful improvements in insect repellers and has for its primary object to provide, in a manner as hereinafter set forth, a device comprising a novel construction, combination and arrangement of parts through the medium of which mosquitoes, flies and other insects may be kept from annoying persons reposing in a bed, thus permitting sound, restful sleep to be had.

Another important object of the invention is to provide an insect repelling device of the aforementioned character comprising a plurality of rotating arms which are adapted to be swung upwardly to an out of the way position when not in use and to facilitate getting into and out of the bed.

Other objects of the invention are to provide a device of the character described which will be simple in construction, strong, durable, efficient and reliable in use, compact, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein.

Figure 1:
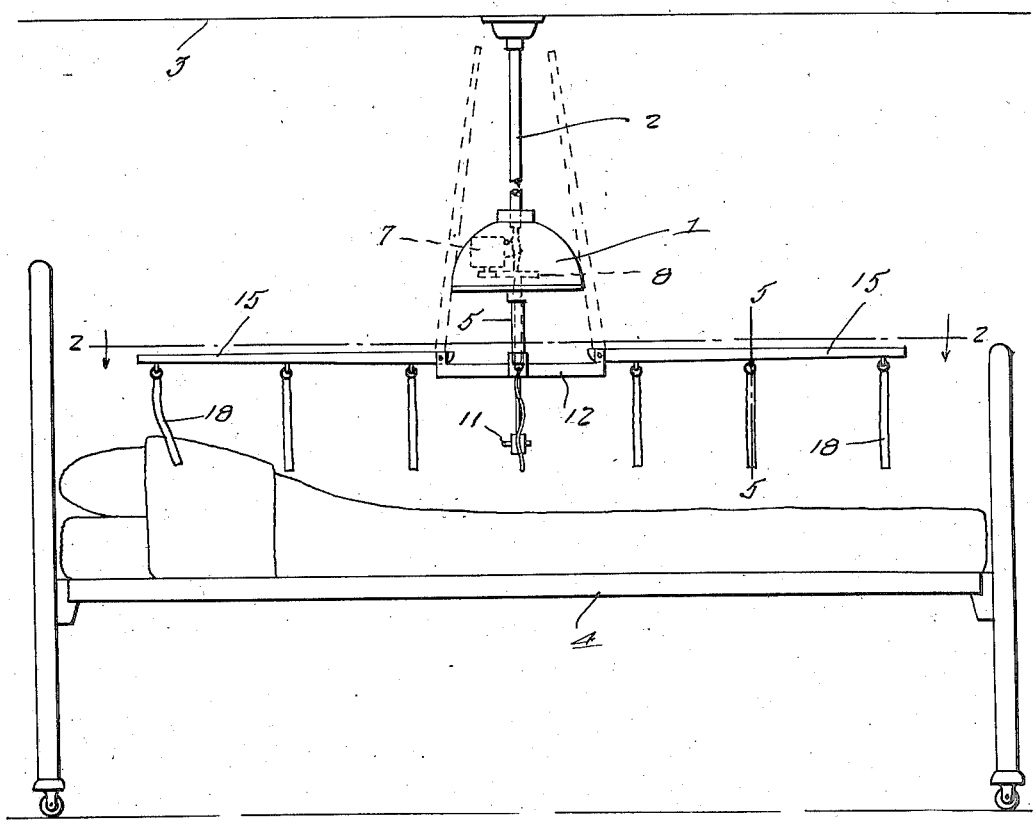
Figure 1 is a view in side elevation of an insect repelling device constructed in accordance with the present invention, showing the same suspended in position for operation above a bed.
Figure 3:
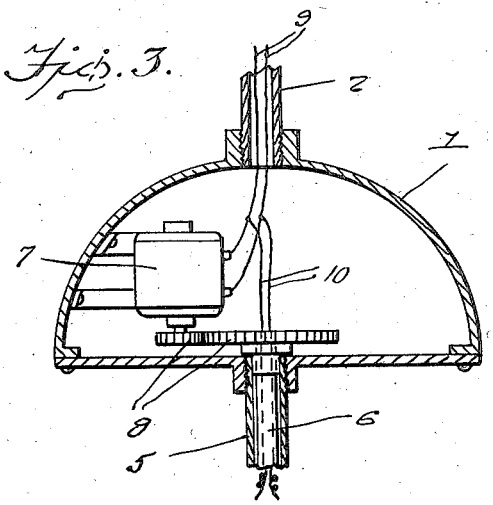
Figure 3 is a detail view in vertical section through the motor housing.
Figure 4:
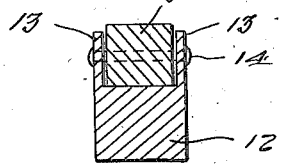
Figure 4 is a detail view in vertical section through the hinge joint of one of the rotating arms, taken substantially on the line 4—4 of Figure 2.
Figure 2:
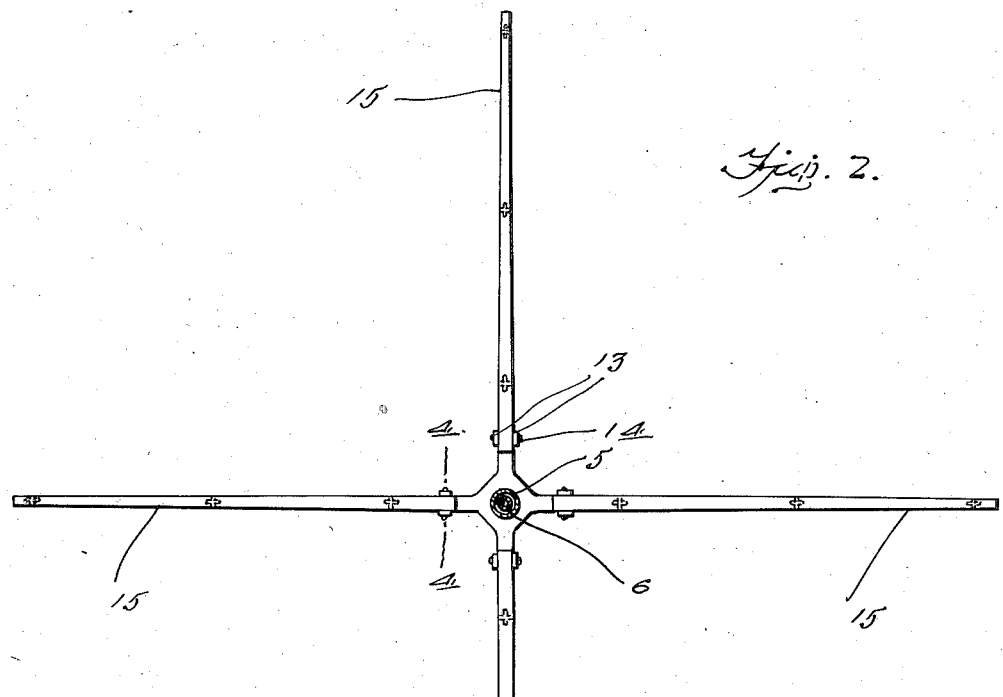
Figure 2 is a horizontal sectional view, taken substantially on the line 2—2 of Figure 1, looking downwardly, as indicated by the arrows.

Referring now to the drawings in detail, it will be seen that the embodiment of the invention which has been illustrated comprises a housing 1 which is suspended by a tubular support 2 from a ceiling 3 above a bed 4. Depending from the housing 1 is a tubular shaft housing 5 in which a tubular shaft 6 is rotatably mounted.

Mounted in the housing 1 is a motor 7 which is operatively connected to the tubular shaft 6 by gears 8. Conductor wires 9 enter the housing 1 through the tubular support 2 for energizing the electric motor 7. Conductor wires 10 from the motor circuit extend through the tubular shaft 6 to a switch 11 for controlling the motor 7.

Figure 6:
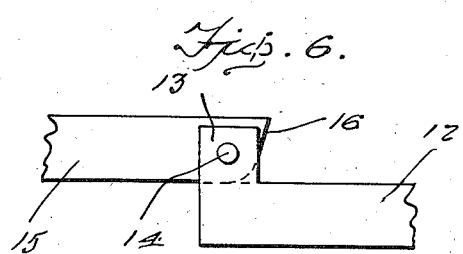
Figure 6 is a detail view in side elevation of the hinge joint of one of the rotating arms.

Fixed on the lower end portion of the tubular shaft 6 is a spider 12 from the free end portions of the legs of which ears 13 rise. It will be noted that the legs of the spider 12 project beyond the periphery of the annular housing 1. Journalled between each pair of ears 13, as on pins 14, are arms 15 which, when in lowered or operative position, extend horizontally above the bed 4 in the manner illustrated to advantage in Figure 1 of the drawings. The construction and arrangement is such that the arms 15 are supported in horizontal position on the legs of the spider 12. The substantially rounded inner ends 16 (see Figure 6) of the arms 15 permit said arms to be swung upwardly to an out of the way position when desired, as indicated in broken lines in Figure 1 of the drawings. When in inoperative position it will be observed that the arms 15 rest by gravity against the annular housing 1.

Figure 5:
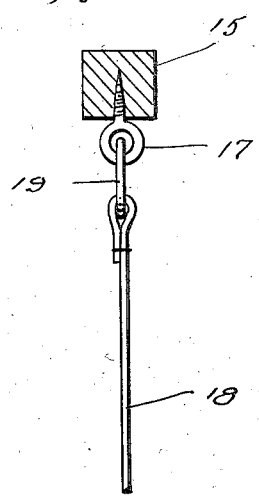
Figure 5 is a detail view in vertical transverse section through one of the arms, taken substantially on the line 5—5 of Figure 1.

At spaced points eye screws 17 are anchored in the lower sides of the arms 15. The reference numeral 18 designates strips of suitable flexible material which are connected by rings 19 (see Figure 5) to the eye screws 17.

It is thought that the operation of the device will be readily apparent. When not in use, or when it is desired to get into or out of the bed 4, the arms 15 are swung upwardly from the position shown in full lines in Figure 1 of the drawings to the position shown in broken lines in said Figure 1. After getting in bed, the occupant of the bed swings the arms downwardly to operative position and then, through the medium of the switch 11, energizes the electric motor 7. When thus energized, the motor 7 rotates the arms 15 with the flexible strips 18 suspended therefrom in a horizontal plane above the bed and the occupant of said bed.

It is believed that the many advantages of an insect repeller constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. An insect repeller of the class described comprising a housing, means for suspending the housing from a support, a tubular housing depending from the first named housing, a shaft rotatably mounted in the tubular housing, a motor mounted in the first named housing and operatively connected to the shaft, a spider fixed on the lower end portion of the tubular shaft, pairs of ears rising from the free end portions of the legs of the spider, arms journalled for swinging movement between the pairs of ears and engageable on the legs of the spider for support in a horizontal position, and flexible strips secured, at spaced points, to said arms.

2. An insect repeller comprising an annular housing suspended from a support, a spider rotatably mounted beneath the housing in spaced relation thereto, the legs of said spider projecting beyond the periphery of the housing, a motor mounted in said housing, means connecting the spider to said motor for actuation thereby, arms pivotally mounted for swinging movement in a vertical plane on the free end portions of the legs of the spider and adapted to rest by gravity against the housing when in inoperative position, and flexible strips secured to said arms.

HENRY MARVIN COUNCIL.